No. 750,210. PATENTED JAN. 19, 1904.
B. P. MERRY.
MUZZLE FOR ANIMALS.
APPLICATION FILED MAY 18, 1903.
NO MODEL.

Witnesses
Percy C. Bowen
E. L. Corbett

Inventor
Benjamin P. Merry.
by Edson Bros
Attorneys.

THE NORRIS PETERS CO., PHOTO-LITHO., WASHINGTON, D. C.

No. 750,210. Patented January 19, 1904.

UNITED STATES PATENT OFFICE.

BENJAMIN PRICE MERRY, OF ARCHBOLD, OHIO.

MUZZLE FOR ANIMALS.

SPECIFICATION forming part of Letters Patent No. 750,210, dated January 19, 1904.

Application filed May 18, 1903. Serial No. 157,696. (No model.)

*To all whom it may concern:*

Be it known that I, BENJAMIN PRICE MERRY, a citizen of the United States, residing at Archbold, in the county of Fulton and State of Ohio, have invented certain new and useful Improvements in Muzzles for Animals; and I do hereby declare the following to be a full, clear, and exact description of the invention, such as will enable others skilled in the art to which it appertains to make and use the same.

My invention relates to certain improvements in what may be termed "muzzles," applicable either to a cow or calf, adapted when used as first mentioned to be effective as against the animal extracting her own milk and when used as last noted effective as against the calf regaling itself from the mother's teats.

The invention is characteristic of great simplicity, lightness, and cheapness of manufacture, while it is capable of ready application for use, is easily constructed, and is effective in use.

Said invention consists of the combination and arrangement of parts, including their construction, substantially as hereinafter more fully disclosed, and specifically set forth in the claims.

Figure 1:
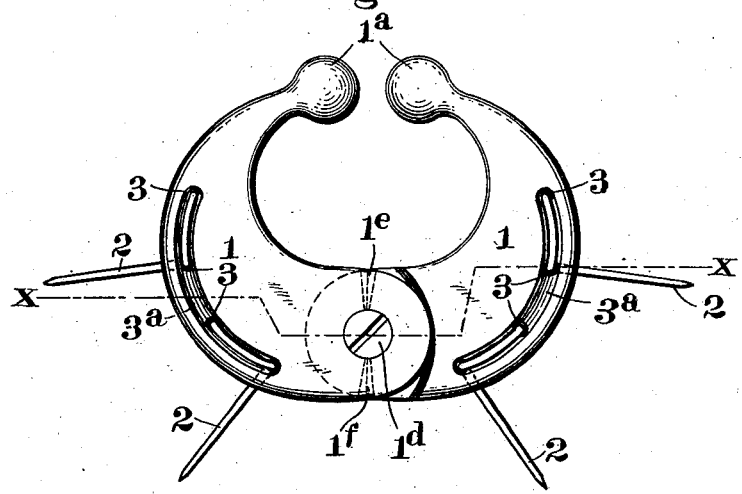
Figure 2:
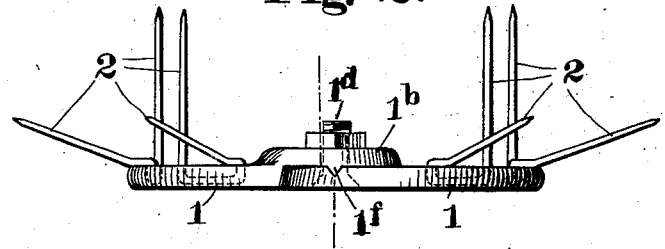
Figure 3:
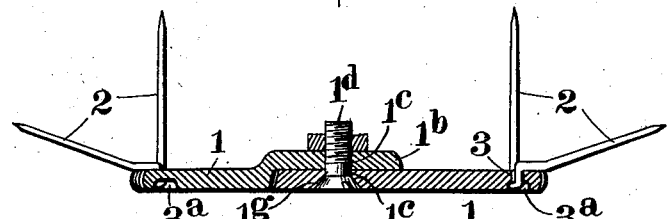
Figure 4:
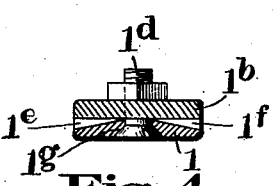

In the accompanying drawings, illustrating the preferred embodiment of my invention, Figure 1 is a plan view. Fig. 2 is a lateral or edge view. Fig. 3 is a broken section taken on the line $x\ x$ of Fig. 1, and Fig. 4 is a similar view taken in a line at right angles to that of Fig. 3.

It will be understood that latitude is allowed herein as to details, as they may be changed as circumstances suggest without departing from the spirit of my invention and said invention yet be protected.

In the carrying out of my invention I produce or make the muzzle generally of two jaws or sections 1 1, preferably of such outline or structure that conjointly they have a crescent shape, the horns thereof being preferably provided or formed with spherical terminals $1^a$. Said sections or jaws are suitably connected together at their wider ends, one end being offset, as at $1^b$, and the other end resting upon said offset, said ends having registering orifices $1^c$ therethrough receiving a headed and nut-provided bolt $1^d$, holding said jaws together. Said jaws are provided at the same ends with engaging ribs $1^e$ and notches $1^f$, respectively, radiating from the bolt-receiving openings, which together with the bolt $1^d$ provide for the effective retention in fixed position of said jaws. Said bolt has its head preferably let into a countersink or recess $1^g$, produced in that side of one of the jaws around the bolt-receiving opening, to that extent lessening the protrusion of the bolt-head and correspondingly removing said head out of the way and from possibility of engaging the animal's flesh. Said jaws are equipped with pricking or irritating wires or prongs 2 or other means adapted for that purpose to render the muzzle as when applied to a cow effective as against the animal extracting its own milk or as when applied to a calf effective as against the latter having access to its mother's teats, for the reasons aforesaid. Said pricking wires or prongs standing at different relative angles with the view to effect said ends pass through apertures or orifices 3, produced in said jaws near the outer edges thereof, and have the uniting portions between their outstanding portions let into grooves or channels $3^a$, produced in said jaws continuously with said apertures or orifices to effect the isolation or removal of said portions of said pricking wires or prongs out of the way and from liability of contact with the animal's flesh.

Of course it will be understood that in applying the muzzle for use the securing-bolt of its jaws is loosened, accordingly permitting the passage of the spherical terminals of the horns of said jaws laterally of the septum of the animal's nose and by returning said jaws to their normal position effect the forcible engagement of said spherical terminals with said septum, resulting in the attachment of the muzzle to the animal's nose.

Having thus described my invention, what I claim, and desire to secure by Letters Patent, is—

1. In a muzzle of the character described the combination of two jaws having their free ends adapted to contact with the animal's nose, grooves in said jaws, pricking-prongs formed of rebent strips with their outstanding portions passing through orifices in said jaws and the loop portions housed in said grooves, substantially as set forth.

2. As a new article of manufacture, a muzzle of the character described comprising two jaws having their free ends adapted to contact with the animal's nose, said jaws having grooves therein, pricking-prongs formed of rebent strips with their outstanding portions passing through orifices in said jaws and the loop portions housed in said grooves, said jaws having their connected ends provided with an offset portion and a portion seated upon the latter, respectively, and a headed and nut-provided bolt passing through apertures in the latter-referred-to portions, said latter-referred-to portions being provided with registering ribs and notches, respectively, radiating from the bolt-receiving orifices of said jaws.

In testimony whereof I affix my signature in presence of two witnesses.

BENJAMIN PRICE MERRY.

Witnesses:
W. V. TAYLOR,
F. MERRY.